United States Patent [19]

Simmons

[11] 4,333,360
[45] Jun. 8, 1982

[54] TRANSMISSION SHIFT CONTROL APPARATUS

[75] Inventor: John P. Simmons, Muncie, Ind.

[73] Assignee: Borg-Warner Corporation, Chicago, Ill.

[21] Appl. No.: 165,895

[22] Filed: Jul. 3, 1980

[51] Int. Cl.³ .......................... G05G 9/12; F16C 11/06
[52] U.S. Cl. ................................ 74/473 P; 74/473 R; 267/150; 403/114
[58] Field of Search .......... 74/473 R, 473 P, 473 SW, 74/475, 471 XY, 476, 477; 267/150; 200/6.A; 403/114

[56] References Cited

U.S. PATENT DOCUMENTS

| 1,886,849 | 11/1932 | Tenney et al. | 74/473 P |
| 2,077,578 | 4/1937 | Neracher | 74/473 P |
| 2,174,504 | 9/1939 | Cole | 74/473 P |
| 2,217,728 | 10/1940 | Burt | 74/473 |

FOREIGN PATENT DOCUMENTS 2804697  8/1978  Fed. Rep. of Germany .... 74/473 R

Primary Examiner—Allan D. Herrmann
Attorney, Agent, or Firm—Julian Schachner

[57] ABSTRACT

Transmission shift control apparatus includes a pin extending from a fulcrum ball to prevent rotation of an associated shift lever. Spring loads are applied to the ends of the pin to establish a neutral position for the shiftf lever in a desired shift plane. The springs are trapped in saddles, which are oriented so as to bias the ball into its seat when the spring load is applied.

11 Claims, 9 Drawing Figures

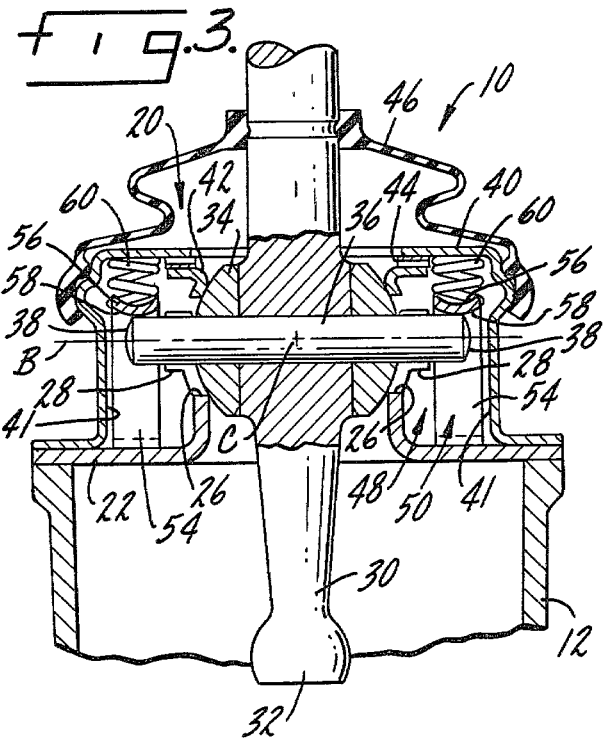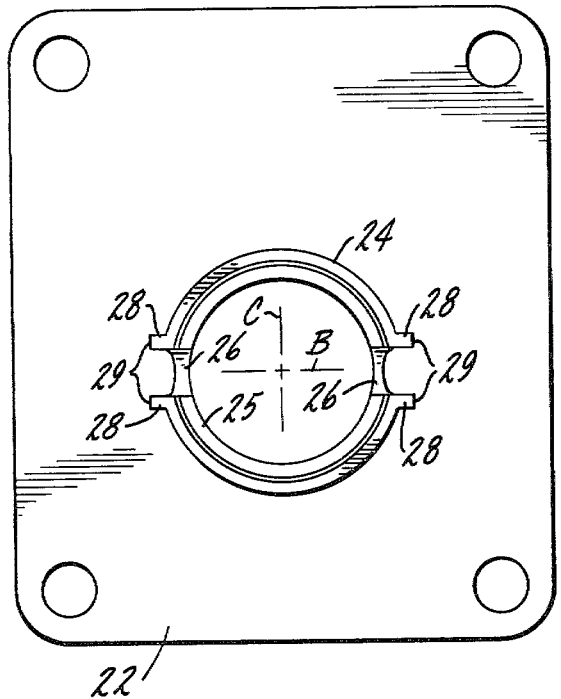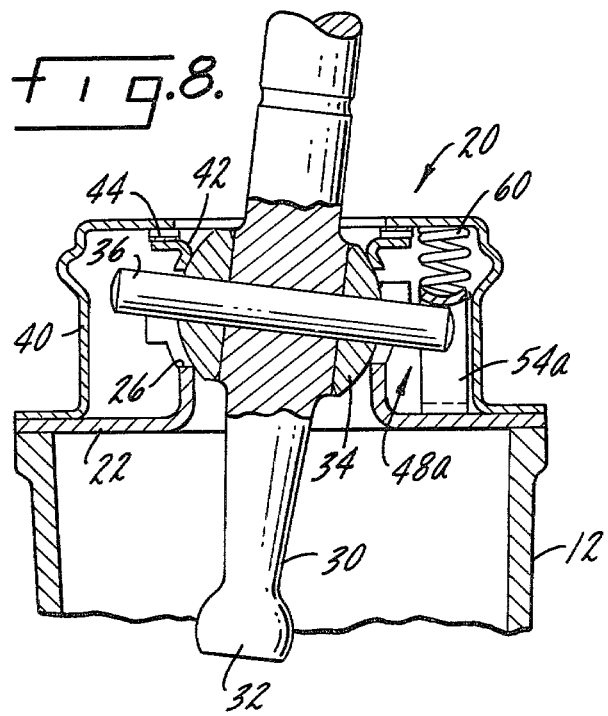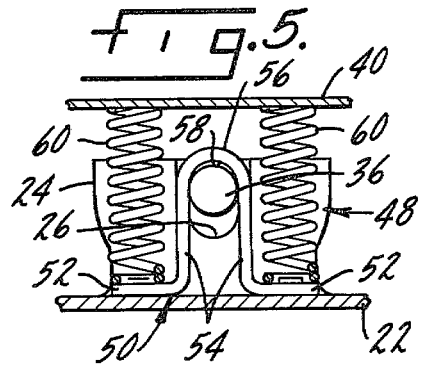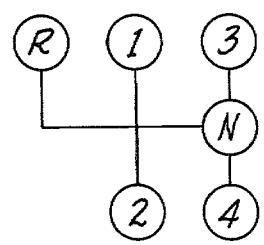

TRANSMISSION SHIFT CONTROL APPARATUS

BACKGROUND OF THE INVENTION

This invention relates generally to automotive transmissions or the like. More particularly, it relates to shift control apparatus for selectively establishing various speed ratios in a change-speed transmission.

In recent years there have been many improvments in the control of automotive transmissions, including improvements relating to the shifting of manual transmissions. Some transmissions included a plurality of shift rails, one of which was selected and moved for corresponding selection and engagement of a desired speed ratio. Other transmissions included a single shift rail which was rotated for speed ratio selection and moved longitudinally for engagement of the selected ratio. These and other types of transmissions necessarily incorporated shift control devices for effecting the various selection and engagement movements. Such devices generally required assemblies which were complex, heavy and expensive to fabricate.

There remains a need in the art to provide simple, light and inexpensive transmission shift control means which may be used with various types of transmissions, and which is adaptable for use in a variety of shift patterns.

SUMMARY OF THE INVENTION

The primary object of this invention is to meet the needs noted above. To that end, there is provided shift control apparatus which may be incorporated in a manual transmission having, for example, five synchronized forward speed ratios and a reverse speed ratio. The apparatus includes a simple, light, inexpensive mechanism for loading a fulcrum ball into its seat, for positioning a shift control lever in a desired shift plane, and for providing forces which aid in establishing operator feel.

A pin extending from the fulcrum ball extends into slots to thereby prevent rotation of the shift lever. Spring loaded saddles engage the pin to position the shift lever in the desired shift plane, and to provide preload forces as the pin contacts the saddles. The springs and saddles are oriented so as to bias the fulcrum ball into its seat when applying this load.

The result is simple, lightweight, inexpensive shift control apparatus which may be easily fabricated and assembled in a transmission.

BRIEF DESCRIPTION OF THE DRAWINGS

The object and advantages of this invention will become apparent to those skilled in the art upon careful consideration of the specification herein, including the drawings, wherein:

FIG. 3 is a sectional view taken along the line 3—3 of FIG. 1 showing additional details of the shift control apparatus;

FIG. 4 is a plan view, similar to FIG. 1, showing additional details of the seat and pin guide slots;

FIG. 5 is an elevational view showing additional details of the biasing mechanism as related to associated structure;

FIG. 8 is a sectional view, similar to FIG. 3, showing details of a modification wherein neutral is not in the central shift plane; and FIG. 9 is a diagrammatic view illustrating a typical shift pattern for a four-speed transmission in which neutral is not in the central shift plane.

Figure 1:
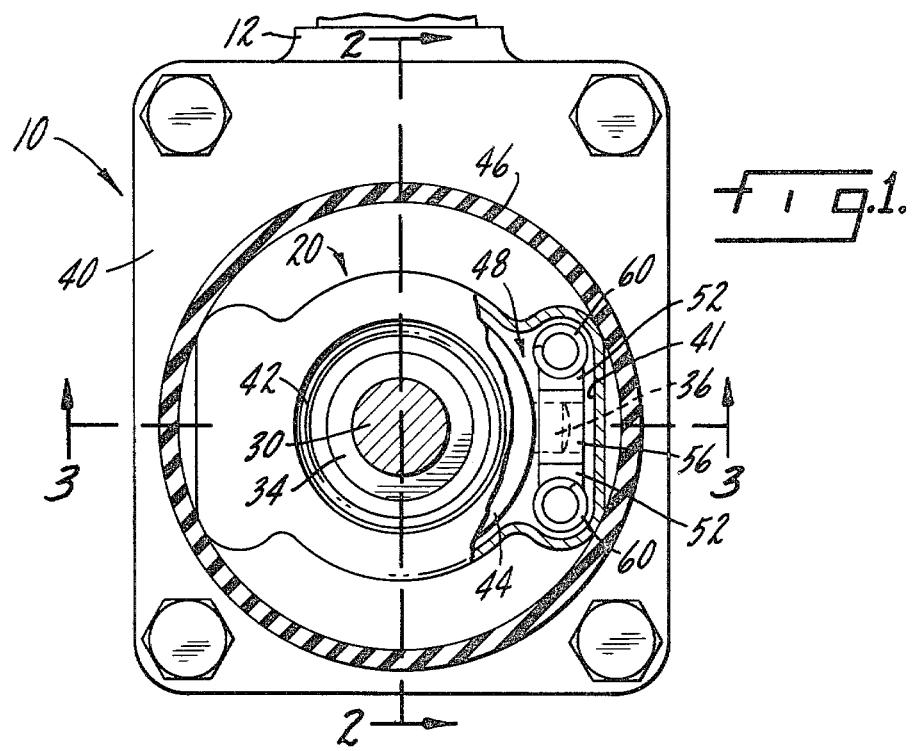
FIG. 1 is a plan view, partially cut away, showing details of the shift control apparatus.

While this invention is susceptible of embodiment in many different forms, there is shown in the drawings and herein will be described in detail a preferred embodiment. It should be understood that the present disclosure is considered to be an exemplification of the principles of the invention, and is not intended to limit the invention to this embodiment.

DESCRIPTION OF A PREFERRED EMBODIMENT

Referring now to the drawings in greater detail, there is shown generally a multiple-speed manual transmission 10 adapted for use in an automotive vehicle or the like. As is conventional (and thus not shown) in such a transmission, there are input and output shafts as well as a plurality of gear sets which may be selectively engaged to establish a plurality of speed ratios for the transfer of torque between the input and output shafts.

By way of example, it may be assumed that transmission 10 provides four or five forward speed ratios and a reverse speed ratio. Within a suitable transmission housing 12, there is, for example, a single shift rail 14 supported for rotation on and sliding movement along its longitudinal axis A. A crank arm 16 or the like is secured to rail 14 for rotational and longitudinal movement therewith. Crank arm 16 defines a bore 18. Rotation of shift rail 14 selects appropriate speed ratios, and longitudinal sliding movement thereof engages a selected ratio. A transmission having selecting and engaging features of this type is disclosed in detail in U.S. application No. 968,058 filed Dec. 11, 1978.

Apparatus 20 for controlling the shift of transmission 10 includes a lower housing member 22 secured to transmission housing 12. Housing member 22 defines an upwardly-opening socket or seat 24 with an inner surface 25, preferably of partial spherical configuration. Seat 24 in turn defines a pair of laterally-spaced, upwardly-opening slots 26. For each slot, seat 24 also defines a pair of spaced, outwardly-extending guide elements 28 with first guide surfaces 29.

A shift lever 30 defines at one end thereof a boss 32 extending into bore 18 of crank arm 16. Shift lever 30 includes a pivot element 34 which may be a fulcrum ball or the like. Fulcrum ball 34 preferably is of partial spherical configuration complementary to that of seat 24. A pin 36 extends outwardly from fulcrum 34 through spaced slots 26, thereby preventing rotation of shift lever 30. Pin 36 lies on a lateral axis B which is perpendicular to axis A, and is formed with curved end surfaces 38.

An upper housing member 40 is secured to transmission housing 12. Housing member 40 defines a pair of second guide surfaces 41. A suitable ring 42 or the like engages fulcrum ball 34. A spring 44 in the form of a wave washer or the like reacts against upper housing number 40 and acts upon ring 42 so as to load fulcrum ball 34 into seat 24 with a predetermined constant force. A suitable boot 46 fits over shift lever 30 and upper housing member 40.

A pair of laterally-spaced biasing mechanisms 48 is provided. Each mechanism 48 is located between housing members 22 and 40, and is guided for vertical movement by surfaces 29 and 41. Each mechanism 48 includes a saddle 50 which defines a pair of outwardly extending base portions 52, a pair of upwardly-extending leg portions 54, and an upper portion 56. This upper portion 56 defines a curved inner surface 58 in contact with pin 36 such that saddle 50 rides on pin 36. Each mechanism 48 also includes a pair of springs 60 or the like reacting against upper housing member 40 and acting upon base portions 52 so as to bias saddle 50 toward lower housing member 22.

Figure 6:
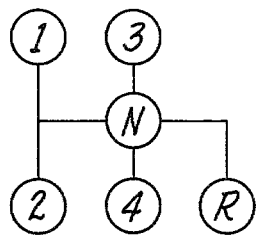
FIG. 6 is a diagrammatic view illustrating a typical shift pattern for a four-speed transmission with neutral in the central shift plane.
Figure 7:
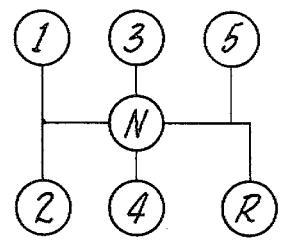
FIG. 7 is a diagrammatic view, similar to FIG. 6, illustrating a typical shift pattern for a five-speed transmission with neutral in the central shift plane.
Figure 2:
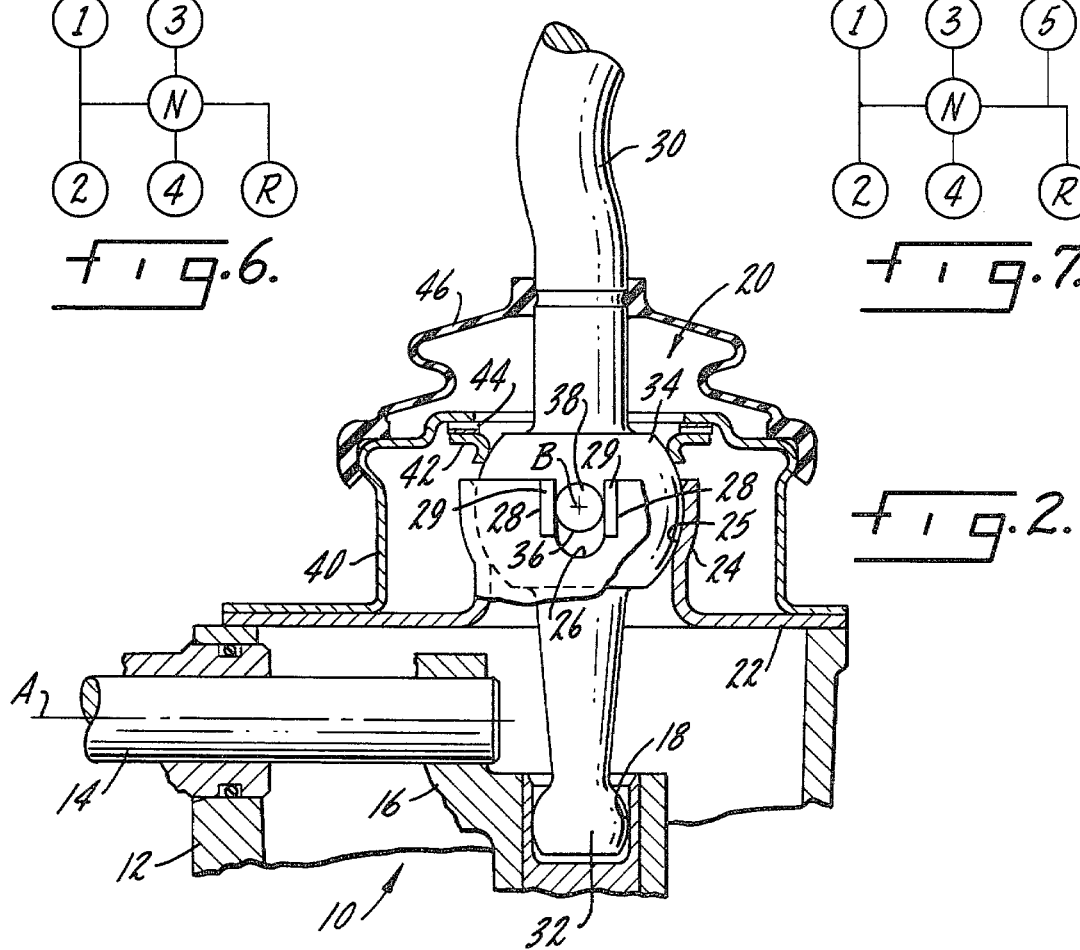
FIG. 2 is a sectional view taken along the line 2—2 of FIG. 1 showing additional details of the shift control apparatus.

In a preferred form of the invention, saddles 50 have the same length, such that base portions 52 contact lower housing member 22 as upper portions 56 bias pin 36 into the horizontal position, as best shown in FIGS. 3 and 5. This places shift lever 30 in neutral when in the central shift plane of a transmission having, for example, three shift planes, as illustrated diagrammatically in FIGS. 6 and 7. With shift lever 30 in this neutral position, shift rail 14 is oriented so as to select the third and fourth forward speed ratios.

For crossover selection of other speed ratios, shift lever 30 is pivoted in a lateral plane about a longitudinal axis C which intersects and is perpendicular to axis B. Counterclockwise movement of shift lever 30, as shown in FIG. 3, would rotate shift rail 14 so as to select the first and second forward speed ratios. Similarly, clockwise movement of shift lever 30 would rotate shift rail 14 so as to select either the reverse speed ratio illustrated in FIG. 6 or the fifth forward and reverse speed ratios illustrated in FIG. 7.

As shift lever 30 is pivoted laterally about axis C, pin 36 disengages from one saddle 50 and lifts the other saddle 50 off of lower housing member 22, thereby compressing its associated springs 60. Vertical movement of either saddle is guided by surfaces 29 and 41. The curvature of surfaces 38 and 58 provides for rolling contact between pin 36 and saddle 50.

After crossover selection, shift lever 30 is pivoted in a longitudinal plane about lateral axis B so as to move shift rail 14 along axis A, thereby engaging one of the selected speed ratios. Pin 36 rotates on axis B, but does not move saddles 50.

Thus, it will be seen that the arrangement of biasing mechanisms disclosed herein preloads the shift lever so as to establish a neutral position in the desired shift plane. Further, the mechanisms load the fulcrum ball into its seat, even when a force is applied to the shift lever for crossover selection. In addition, the mechanisms develop increasing resistance to crossover movement of the shift lever, which increasing resistance is felt by the operator.

An alternative embodiment of the invention, shown in FIG. 8 and illustrated diagrammatically in FIG. 9, may be used where it is desired to provide neutral in a plane other than the central shift plane. One mechanism 48 is eliminated, and a mechanism 48a is substituted for the other mechanism 48. Mechanism 48a is similar to mechanism 48 except that leg portions 54a of saddle 50 are somewhat shorter than leg portions 54. This is all that is required to preload shift lever 30 into a neutral position in the 3-4 shift plane, for example. One advantage of such an arrangement is that the operator feels a relatively light resistance during the shift from the 3-4 plane to the 1-2 plane, and a relatively heavy resistance during the shift to the reverse plane.

For the configuration shown in FIG. 8, a short pin 36 could be provided, thus allowing for elimination of the free slot 26. Alternatively, two mechanisms 48a could be provided, one with relatively short leg portions 54a, and the other with relatively long leg portions.

In either embodiment disclosed herein, the arrangement is such that shift lever 30 is positioned in its neutral position, fulcrum ball 34 is biased into its seat during crossover selection, and suitable forces are developed for indicating operator feel.

Obviously, the shift control apparatus disclosed herein may be used with transmissions other than the single rail manual transmission described by way of example.

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. Shift control apparatus comprising a housing defining a seat having at least one slot, a shift lever including a pivot element in said seat and a pin extending through each slot, and biasing means including at least one biasing mechanism, each biasing mechanism including a saddle riding on said pin and extending therefrom with a pair of base portions contiguous to said housing, and resilient means including a pair of springs respectively biasing said base portions toward contact with said housing.

2. The apparatus of claim 1, said housing including a first housing member defining said seat, and a second housing member, said springs reacting against said second housing member and acting upon said base portions to urge said saddle toward contact with said first housing member.

3. The apparatus of claim 2, said saddle being movable away from said first housing member by said pin as said shift lever is pivoted in one plane including the axis of said pin, and said shift lever being pivotable in another plane perpendicular to said one plane without effecting movement of said saddle by said pin.

4. The apparatus of claim 3, said saddle and pin being constructed and arranged to provide rolling surface contact therebetween as said shift lever is pivoted in said one plane.

5. The apparatus of claim 3, said first and second housing members respectively defining first and second guide means restraining movement of said saddle.

6. The apparatus of claim 3, said seat being of at least partial spherical configuration, said pivot element being a fulcrum ball, and means loading said ball into said seat with a predetermined constant force.

7. The apparatus of claim 1, 2, 3, 4, 5 or 6, said seat having a pair of spaced slots, said pin extending through said slots, and said biasing means including a pair of spaced biasing mechanisms.

8. Shift control apparatus comprising a housing, means defining a seat, means defining a pair of laterally spaced slots, a shift lever including a fulcrum loaded into said seat and a pin extending through said slots, said pin having a lateral axis, and a pair of biasing mechanisms, each mechanism including a saddle with an upper portion adapted to ride on said pin, a pair of leg portions extending downwardly therefrom, a pair of longitudinally extending base portions contiguous to said housing, and a pair of springs acting upon said base portions to bias said saddle downwardly toward contact with said housing, said saddles being selectively movable by said pin upwardly away from said housing upon selective pivotal movement of said shift lever in a lateral plane including said lateral axis, and said shift lever being pivotable about said lateral axis in a longitudinal plane without effecting movement of said saddles by said pin.

9. The apparatus of claim 8, said leg portions having the same length, whereby said shift lever has a neutral position in which said lateral axis is substantially horizontal.

10. The apparatus of claim 8, said leg portions having different lengths, whereby said shift lever has a neutral position in which said lateral axis is substantially transverse to horizontal.

11. The invention of claim 8, 9 or 10, said pin and upper portion defining curved surfaces for providing rolling surface contact therebetween as said shift lever is pivoted in said lateral plane, and means defining surfaces for guiding upward and downward movement of said saddles.

* * * * *